United States Patent
Zepf et al.

(10) Patent No.: US 11,135,692 B2
(45) Date of Patent: Oct. 5, 2021

(54) TOOL HOLDER OR WORKPIECE HOLDER AND SET COMPRISING MACHINE TOOL AND TOOL HOLDER OR WORKPIECE HOLDER

(71) Applicant: HAAS SCHLEIFMASCHINEN GMBH, Trossingen (DE)

(72) Inventors: Timo Zepf, Seitingen-Oberflacht (DE); Martin Finsler, Villingen-Schwenningen (DE)

(73) Assignee: HAAS SCHLEIFMASCHINEN GMBH, Trossingen (DE)

( * ) Notice: Subject to any disclaimer, the term of this patent is extended or adjusted under 35 U.S.C. 154(b) by 240 days.

(21) Appl. No.: 16/413,099

(22) Filed: May 15, 2019

(65) Prior Publication Data
US 2019/0351518 A1 Nov. 21, 2019

(30) Foreign Application Priority Data
May 17, 2018 (EP) .................................... 18172995

(51) Int. Cl.
| | |
|---|---|
| *B23Q 3/10* | (2006.01) |
| *B23Q 1/44* | (2006.01) |
| *B23Q 1/72* | (2006.01) |
| *B23Q 3/06* | (2006.01) |
| *B23Q 3/12* | (2006.01) |

(52) U.S. Cl.
CPC ............... *B23Q 3/105* (2013.01); *B23Q 1/44* (2013.01); *B23Q 1/72* (2013.01); *B23Q 3/06* (2013.01); *B23Q 3/12* (2013.01)

(58) Field of Classification Search
CPC ... B23B 2231/04; B23B 31/04; B23B 31/006; B23Q 3/12; B23Q 3/105; B23Q 3/06; B23Q 1/44; B23Q 1/72; Y10T 279/3406
See application file for complete search history.

(56) References Cited

U.S. PATENT DOCUMENTS 3,554,080 A * 1/1971 Herrmann ............. B23B 31/006
409/234

FOREIGN PATENT DOCUMENTS

| CH | 686 120 A5 | 1/1996 |
|---|---|---|
| EP | 0443102 A1 | 8/1991 |
| FR | 0101017 A1 | 7/2002 |

OTHER PUBLICATIONS

Search Report dated Dec. 3, 2018 issued in corresponding in European Application No. 18172995.5.

* cited by examiner

*Primary Examiner* — Tyrone V Hall, Jr.

(74) *Attorney, Agent, or Firm* — Nath, Goldberg & Meyer; Jerald L. Meyer

(57) ABSTRACT

Provided is a tool holder or workpiece holder (100, 200) for coupling a tool to a drive spindle of a machine tool, said holder comprising a tool holding or workpiece holding section (110, 210) on which a clamping means (111, 211) for holding the tool is arranged, and comprising a coupling section (120, 220) for coupling to a tool interface (150, 160, 250, 260) of the drive spindle of the machine tool, in which the coupling section (120, 220) is configured as suitable for coupling both to a tool interface (150, 250) for receiving tool holders or workpiece holders that comply with a first standard and to a tool interface (160, 260) for receiving tool holders or workpiece holders that comply with a second standard.

Figure 1:
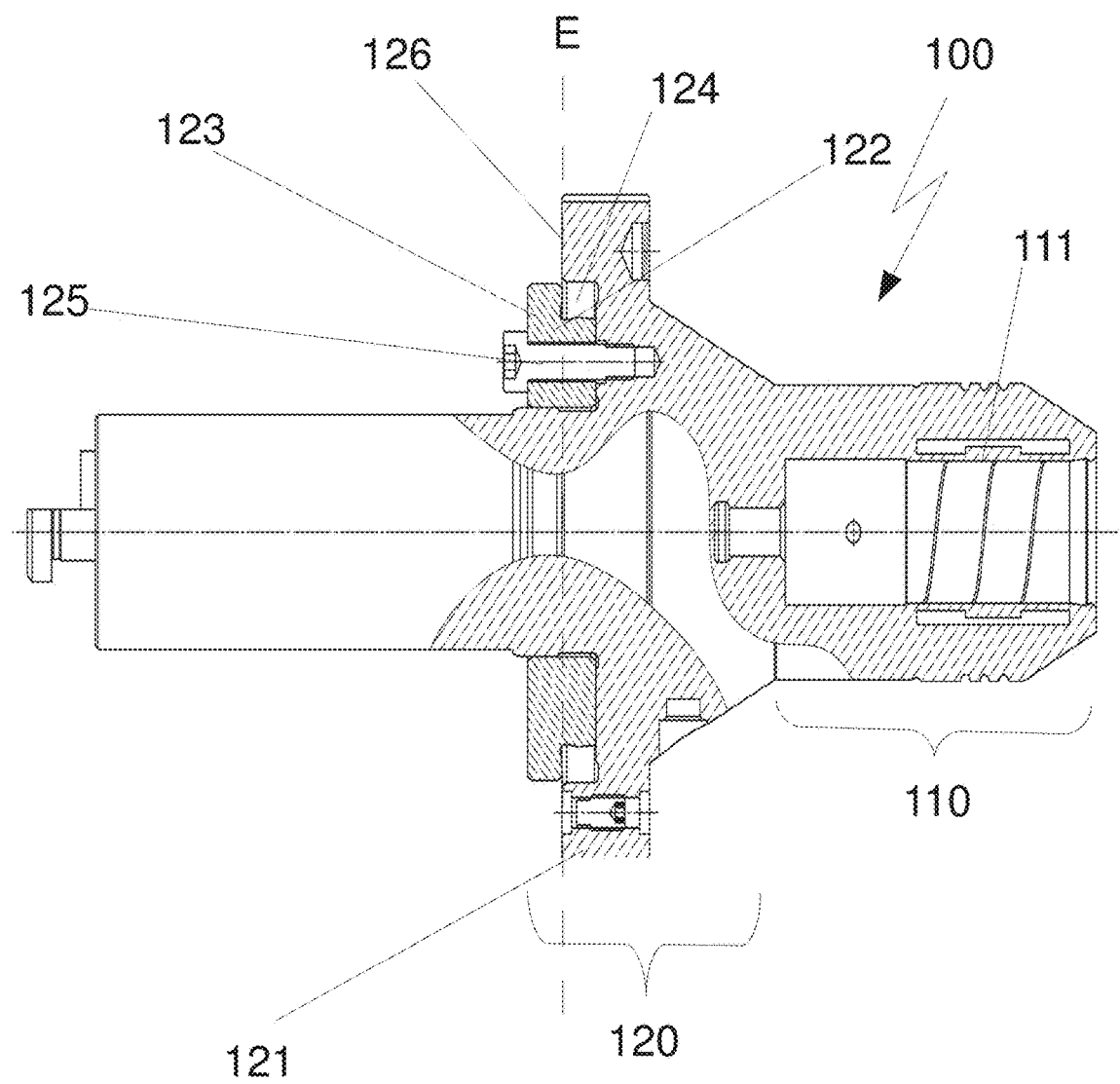

16 Claims, 6 Drawing Sheets

# TOOL HOLDER OR WORKPIECE HOLDER AND SET COMPRISING MACHINE TOOL AND TOOL HOLDER OR WORKPIECE HOLDER

The invention relates to a tool holder or workpiece holder having the features of the preamble of claim 1 and a set comprising a machine tool and such a tool holder or workpiece holder.

Machine tool operation is becoming increasingly automated. As a part of this automation, in particular, tool changes during the operation of such machine tools are also being partially or fully automated. It is routine practice to provide the various tools with a tool holder and to use the tool holder to connect the tool to the corresponding spindle of the machine tool. The tool holder thus forms the interface between tool and machine.

To ensure that tools can be used with different machine tools, standardized tool holders are available, for which DIN standards exist, e.g., DIN 69871-1, DIN 2080, DIN 69893-1, and DIN 69880. Morse taper tool holders, identified by "MK", are now considered to be largely outdated. Steep taper tool holders, identified by "SK", which are a refinement of Morse taper holders, are currently still in widespread use. However, these have now also been further developed into hollow shank taper holders, identified by "HSK", which offer advantages in particular for operation at high speeds and which also offer advantages during tool changes. All identifiers also specify the nominal size; for example, an HSK80 interface is a hollow shank taper holder with a nominal size of 80.

It should be noted that there are also cases in which the workpiece to be machined is coupled to the spindle. To clarify this, in the following the term "tool holder or workpiece holder" will be used, although in principle any tool holder is actually also a workpiece holder or can become a workpiece holder if the clamping means used to hold the tool when the holder is used as a tool holder is used to hold a workpiece. In other words, tool holders and workpiece holders do not necessarily differ from one another structurally.

The standardized section of the tool holder or workpiece holder, which is connected to the spindle, is referred to in this specification as the "coupling section", and the standardized section of the spindle, which interacts with this coupling section of the tool holder or workpiece holder, is referred to as the tool interface. It should be noted that while the tool interfaces are always designed by manufacturers to be properly compatible with standardized coupling sections of tool holders or workpiece holders, they may optionally be modified on a manufacturer-specific basis.

Naturally, it would be desirable to avoid having to keep a different embodiment of every tool on hand for each standard. One known way to avoid this is to provide interface adapters for coupling tool holders or workpiece holders that comply with a first standard to the spindle of a machine tool designed for tool holders or workpiece holders that comply with a second standard.

Such an interface adapter is therefore effectively a component with which the spindle of the machine tool is extended, with the connection to the spindle being established via a section in the machine-side end region of the interface adapter that complies with the standard for the tool holder or workpiece holder for which the machine tool is designed, and the interface adapter having in its tool-side end region a receptacle for the coupling section of the tool holder or workpiece holder that complies with the other standard.

In practice, however, this approach creates drawbacks. For one, it results in an extension of the spindle of the machine tool by the interface adapter, which generally decreases the amount of space available for machining the workpiece. For another, it increases the number of points at which misalignment can occur, which may negatively impact reproducible error accuracy.

The object of the invention is therefore to provide a tool holder or workpiece holder suitable for use with tool interfaces of machine tool spindles that are designed to interact with tool holders or workpiece holders that comply with different standards, even without an interface adapter.

This object is attained by a tool holder or workpiece holder having the features of claim 1 and by a set comprising a machine tool and at least one such tool holder or workpiece holder and having the features of claim 7. Advantageous refinements of the invention are the subject of the respective dependent claims.

The tool holder or workpiece holder according to the invention for coupling a tool or workpiece to a drive spindle of a machine tool has a tool holding or workpiece holding section on which a clamping means for holding the tool or workpiece is arranged, and has a coupling section for coupling to a tool interface of the drive spindle of the machine tool.

It is an essential feature of the invention that the configuration of the coupling section makes it suitable for coupling both to a tool interface for receiving tool holders or workpiece holders that comply with a first standard and to a tool interface for receiving tool holders or workpiece holders that comply with a second standard. This capability is based particularly on the realization that for proper functioning of the machine tool, it is entirely adequate for nearly all applications for a part of the coupling section and a part of the tool interface to work together to connect the tool to the spindle of the machine tool. This realization makes it possible to provide coupling sections that can interact with tool interfaces designed to receive tool holders or workpiece holders that comply with different standards.

It should be noted in particular that, for the purposes of this description, a tool interface is considered suitable for receiving a tool holder or workpiece holder of a given standard if said interface is able to interact with such a tool holder that is subject to the given standard such that tools held in the tool holder can be used by the machine tool for machining workpieces, or such that workpieces held in the workpiece holder can be machined with tools by the machine tool. Based on this conceptual understanding, in particular, the tool interface can be modified, particularly on a manufacturer-specific or application-specific basis, in such a way that sections of the tool interface no longer contribute to the interaction between the tool interface and a standard tool holder or workpiece holder.

One specific option for realizing such a coupling section is one in which the coupling section has an adapter ring that can be secured on the tool holder or workpiece holder in two different orientations, so that when the adapter ring is in one orientation, the tool holder or workpiece holder can be coupled to the tool interface for receiving tool holders or workpiece holders that comply with the first standard, and when the adapter ring is in the other orientation, the tool holder or workpiece holder can be coupled to the tool interface for receiving tool holders or workpiece holders that comply with the second standard.

The use of the term "ring" in the term "adapter ring" is intended as a geometric restriction in particular only insofar as it stipulates that the geometric structure of the adapter ring can be described by a 360° rotation of a surface about an axis lying in the same plane as the surface but not intersecting the surface. A disc-shaped structure can therefore also be understood as an adapter ring. Important for the coupling of the adapter ring to a tool interface is in particular the shaping of the sections of the surface contour, on the side facing away from this axis, i.e., its outer contour.

Such an adapter ring can thus be designed such that above a plane in which its radii lie, its outer contour is configured to interact with a tool interface for receiving tool holders or workpiece holders of a first standard, whereas below this plane, its outer contour is configured to interact with a tool interface for receiving tool holders or workpiece holders of a second standard. Depending upon whether the outer contour above the plane or the outer contour below the plane is facing the tool interface, which can be achieved simply by rotating the adapter ring 180° about an axis lying in this plane and containing a radius of the adapter ring, interaction with a tool interface for tool holders or workpiece holders that comply with the first standard or with a tool interface for tool holders or workpiece holders that comply with the second standard can then be achieved.

It should be noted in this regard that the upper side and the lower side may extend different distances in the axial direction, i.e., perpendicular to said plane, in order to satisfy the requirements of the different tool interfaces with which they are intended to interact.

The adapter ring can be secured with screws, for example, which pass through the adapter ring material in a direction substantially perpendicular to the plane in which the radii of the ring lie, and fasten said ring to the tool holder or workpiece holder.

It is particularly preferable for the adapter ring to be accommodated partially, in particular with a portion of the upper or lower side of said ring relative to the plane in which the radii of the adapter ring lie, in an annular groove introduced into the tool holder or workpiece holder. When this is carried out without clearance, a highly accurate positioning of the adapter ring is achieved. On the other hand, an annular groove with a certain amount of play in conjunction with adjusting means allows compensation for tolerances, which may also be desirable depending on the application.

An alternative specific option for realizing a first coupling section according to the invention is one in which the coupling section has a first section that allows coupling to a tool interface for receiving tool holders or workpiece holders that comply with the first standard and has a second section that adjoins the first section indirectly, i.e. via an intermediate region, or directly, in particular in the axial direction of the tool holder or workpiece holder, which typically coincides with the path of the axis of rotation of the tool or workpiece held in the tool holder or workpiece holder during its use, said second section allowing coupling to a tool interface for receiving tool holders or workpiece holders that comply with the second standard.

In particular, such a tool holder or workpiece holder can be realized for applications in which the tool interface for receiving tool holders or workpiece holders that comply with the first standard is a tool interface suitable for steep taper tool holders, and the tool interface for receiving tool holders or workpiece holders that comply with the second standard is a tool interface suitable for hollow shank taper tool holders. In these cases, it has been found to be particularly useful for the section intended to interact with the tool interface suitable for steep taper tool holders to be situated a greater distance from the clamping means than the section that is suitable for interacting with hollow shank taper tool holders.

The combination of such a first and such a second section in one coupling section can be achieved particularly effectively if the sections are adapted for use with an SK50 tool interface and an HSK80 tool interface.

Regardless of the specific embodiment of the coupling section according to the invention, it has proven advantageous for the tool holder or workpiece holder to have a stop that defines the insertion depth of the tool holder or workpiece holder into the tool interface. This may be the end face of a collar, for example, which is arranged such that said end face interacts at the desired insertion depth with an end face of the spindle.

The set according to the invention comprises a machine tool having at least one spindle which has a tool interface for receiving tool holders or workpiece holders that comply with a first standard, and also comprises at least one tool holder or workpiece holder according to the invention.

According to one advantageous embodiment of such a set, the tool interface has at least one modified section, so that in the modified section(s), said tool interface will not interact with a tool holder or workpiece holder that complies with the first standard, however the interaction of said tool holder or workpiece holder with the other sections of such a modified tool interface guarantees the safe and proper usability of the tool holder or workpiece holder that complies with the first standard and the tool disposed therein when using the machine tool.

For example, a tool interface for a tool holder according to the SK50 standard may have an annular recess with a diameter of 70 mm in its modified end-face section, without sacrificing functionality for use with SK50 standard tool holders.

The particular advantage of this type of modification is that it can provide additional degrees of freedom in the configuration of the coupling section of the tool holder or workpiece holder according to the invention.

In particular, it is advantageous for only portions of the tool interface to interact with the coupling section of the tool holder or workpiece holder, or more precisely, with one of the sections of the coupling section of the tool holder or workpiece holder, when the tool holder or workpiece holder is situated correctly on the tool interface. The respectively other portions of the coupling section of the tool holder or workpiece holder can then be configured such that they can be used to produce interaction with tool interfaces that are designed for use with a different standard, in particular the second standard.

Figure 2A:
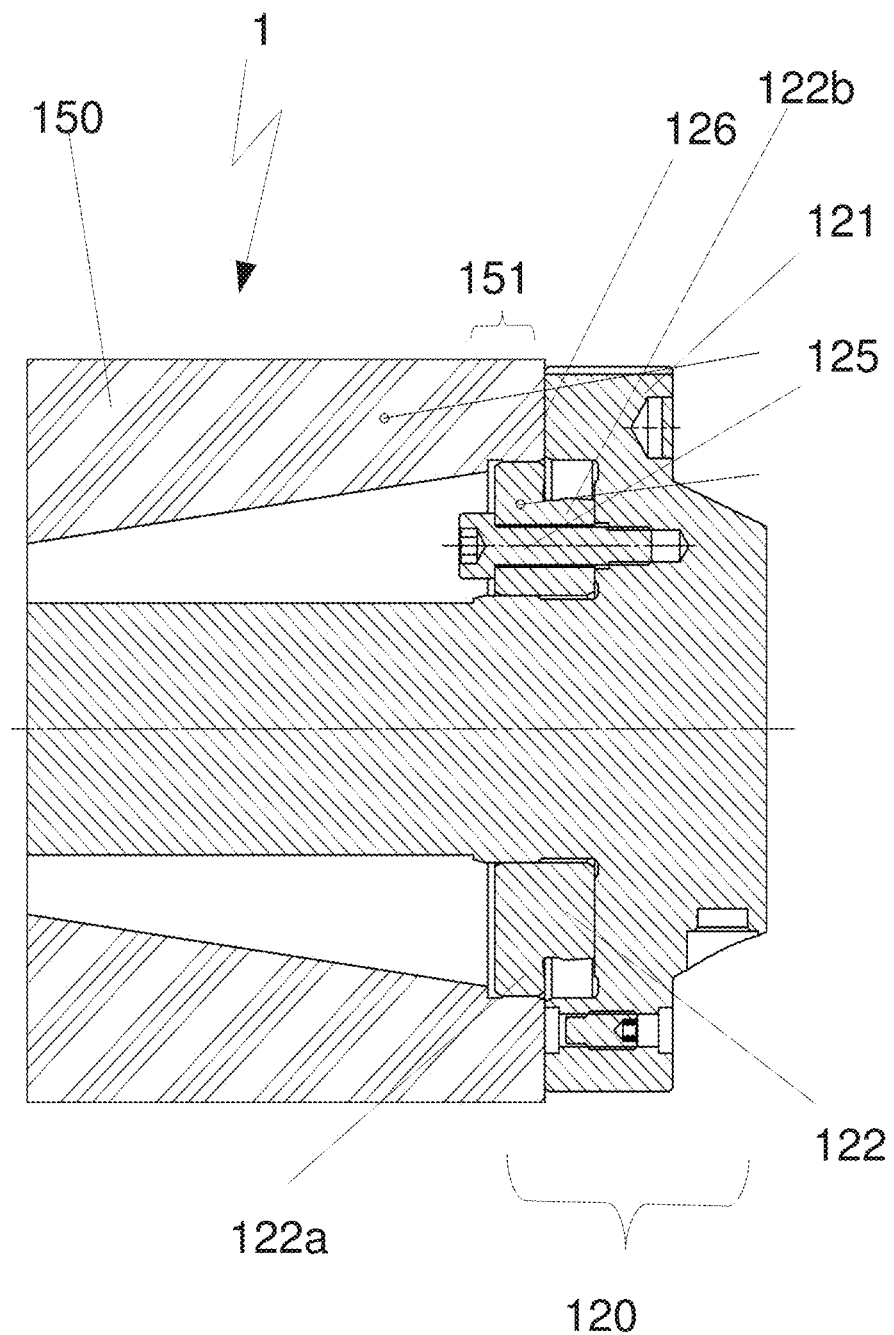
Figure 2B:
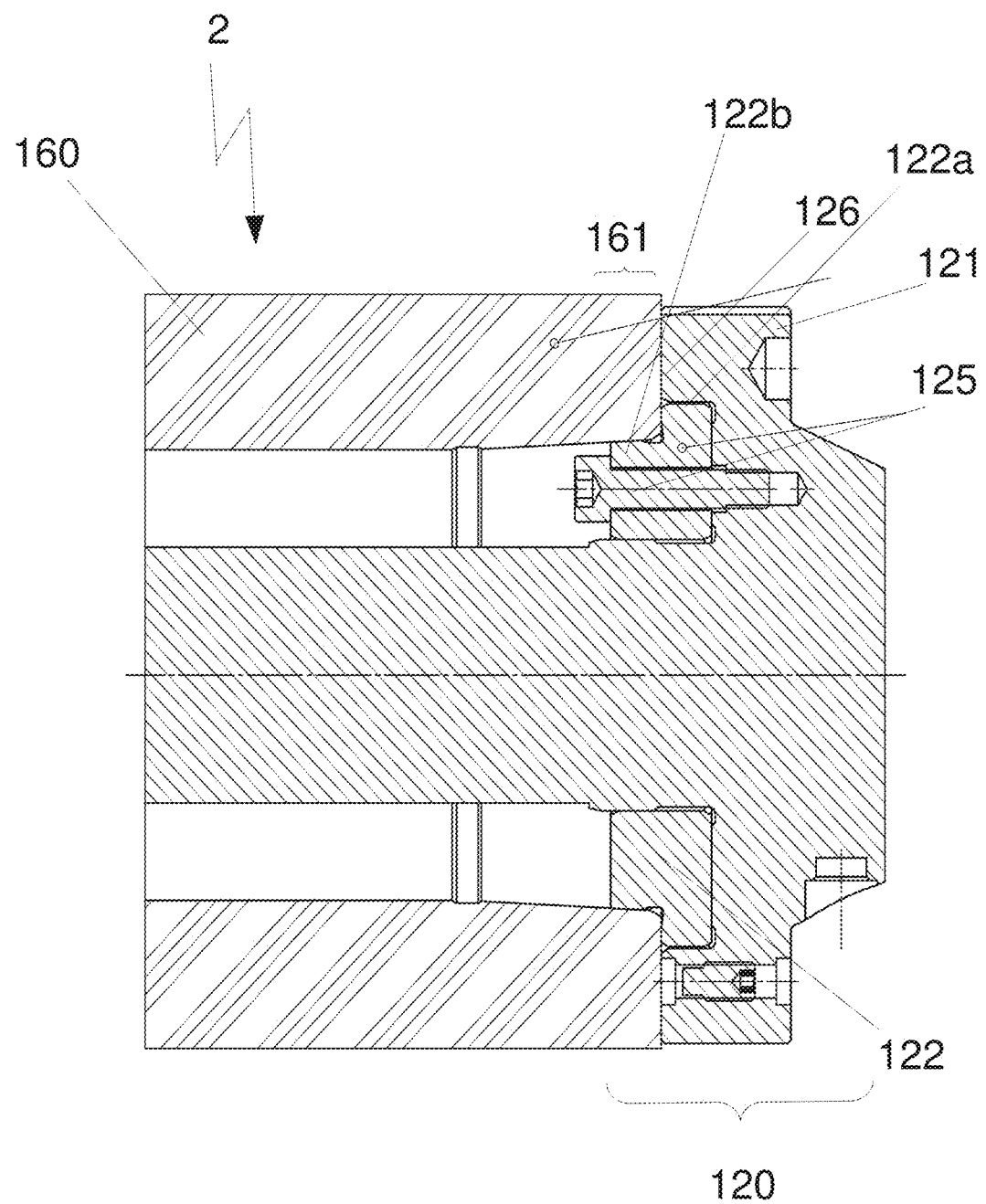
Figure 3:
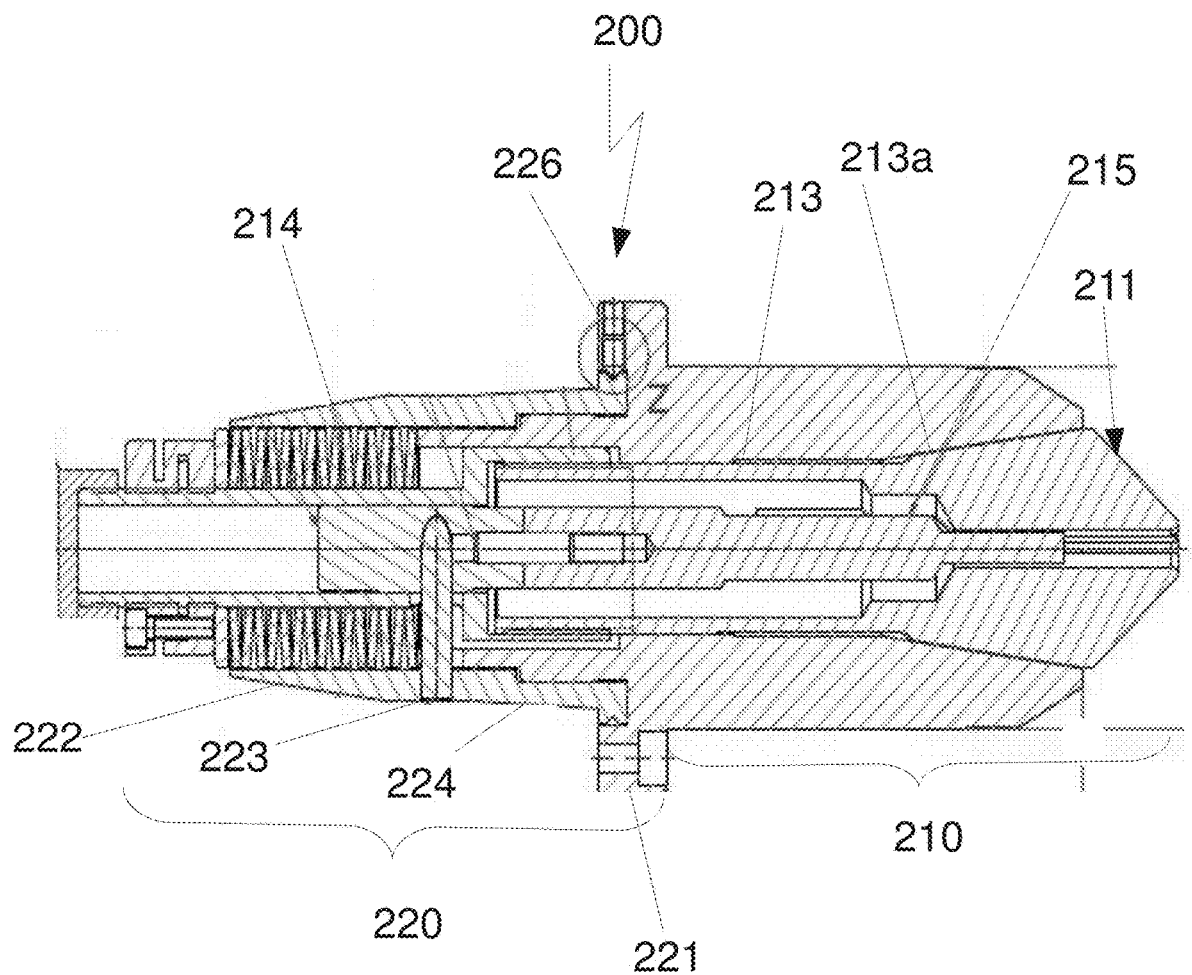
Figure 4A:
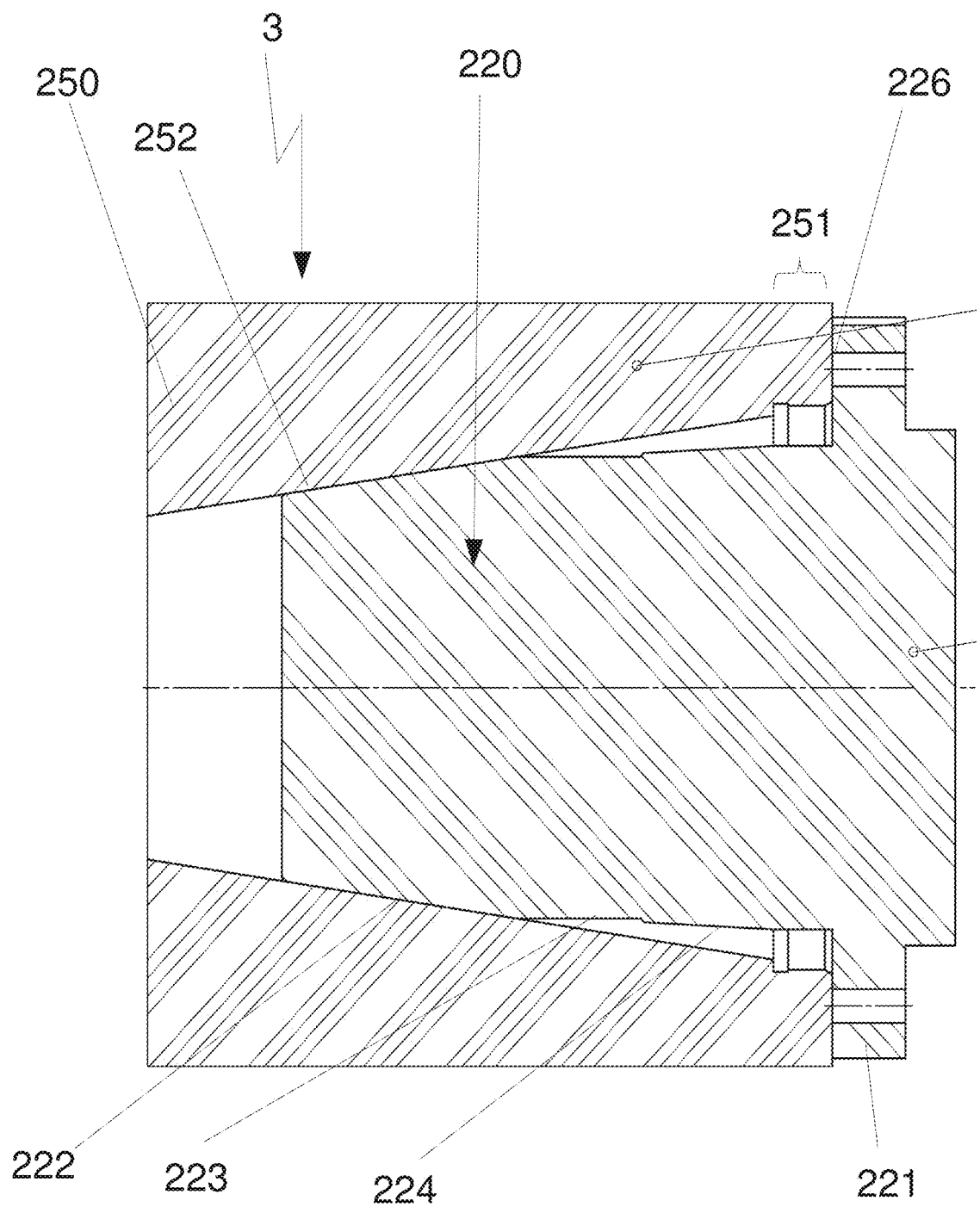
Figure 4B:
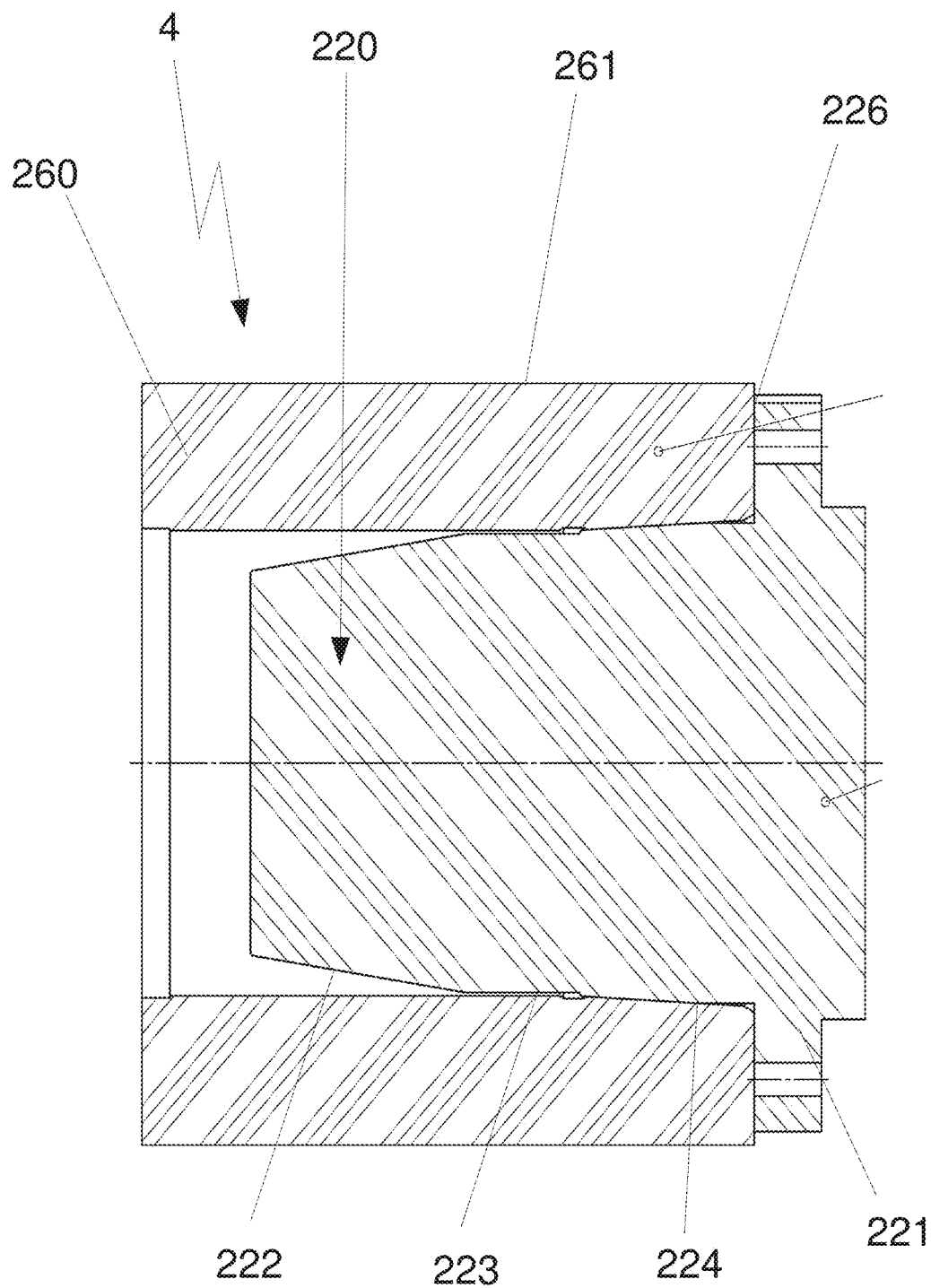

In the following, the invention will be explained in greater detail with reference to figures that illustrate exemplary embodiments. In the drawings:

FIG. 1 shows a first exemplary embodiment of a tool holder or workpiece holder in cross section, FIG. 2*a* shows a detail of a set that comprises a machine tool and a tool holder or workpiece holder 100 according to FIG. 1, illustrating the interaction of the tool holder or workpiece holder 100 with a tool interface for tool holders according to the SK50 standard, FIG. 2*b* shows a detail of a set that comprises a machine tool and a tool holder or workpiece holder 100 according to FIG. 1, illustrating the interaction of the tool holder or workpiece holder 100 with a tool interface for tool holders according to the HSK80 standard, FIG. 3 shows a second exemplary embodiment of a tool holder or workpiece holder in cross section, FIG. 4a shows a detail of a set that comprises a machine tool and a tool holder or workpiece holder 200 according to FIG. 3, illustrating the interaction of the tool holder or workpiece holder 200 with a tool interface for tool holders or workpiece holders according to the SK50 standard, and FIG. 4b shows a detail of a set that comprises a machine tool and a tool holder or workpiece holder 200 according to FIG. 3, illustrating the interaction of the tool holder or workpiece holder 200 with a tool interface for tool holders that comply with the HSK80 standard.

FIG. 1 shows a first exemplary embodiment of a tool holder or workpiece holder 100 for coupling a tool (not shown in FIG. 1) to a drive spindle of a machine tool (likewise not shown in FIG. 1). On the tool side, i.e., on the side on which the tool is held, tool holder or workpiece holder 100 has a tool holding or workpiece holding section 110, which for its part is a clamping means 111, and which in this example is embodied as a conventional, professionally known hydraulic chuck and therefore requires no more detailed description.

On the machine side, i.e., on the side on which the interaction with the drive spindle or its tool interface is produced, tool holder or workpiece holder 100 further comprises a coupling section 120, for coupling to a tool interface (not shown in FIG. 1) of a drive spindle of a machine tool, said coupling section comprising in particular a collar 121, an adapter ring 122, and a cylindrical extension 123.

Adapter ring 122 is configured such that its outer contour 122a lies on one side of a plane E in which the radii of adapter ring 122 lie and which in FIG. 1 coincides approximately with the machine-side surface of collar 121, in the orientation of adapter ring 122 to the left of the plane E as illustrated in FIG. 1, is suitable for receiving in a tool interface that complies with the SK50 standard. In contrast, outer contour 122b, which lies on the other side of the plane E in which the radii of adapter ring 122 lie and which in FIG. 1 coincides approximately with the machine-side surface of collar 121, in the orientation of adapter ring 122 to the right of the plane E as illustrated in FIG. 1, is suitable for inclusion in a tool interface that complies with the HSK80 standard.

Recessed in the machine-side surface of collar 121, which forms a stop 126, is an annular groove 124, in which adapter ring 122 is partially received, in particular with outer contour 122b, and secured with screws 125, so that only outer contour 122a is available for interaction with a tool interface. This obviously makes it possible to rotate adapter ring 122 by 180° if necessary, so that outer contour 122a dips into annular groove 124 and outer contour 122b is available for interaction with a tool interface.

FIG. 2a shows a detail of a set 1 comprising a machine tool and a tool holder or workpiece holder 100 according to FIG. 1, which illustrates the interaction of tool holder or workpiece holder 100 with a tool interface for tool holders that comply with the SK50 standard, specifically with the set in a state in which the tool holder or workpiece holder is disposed on the machine tool. This detail covers the region of interaction between the end section of a tool interface 150, facing the tool, of a spindle of a machine tool and the coupling section 120 of the tool holder or workpiece holder 100.

In this case, the illustrated tool interface 150 is designed to receive tool holders that comply with the SK50 standard, however it includes in its end region facing the tool a modified section 151, which is configured with an annular recess having a diameter of 70 mm.

As is clear from FIG. 2a, only a portion of tool interface 150, namely the modified section 151, interacts with coupling section 120 of the tool holder or workpiece holder, more precisely with section 122a of adapter ring 122. This is sufficient to reliably achieve the coupling between tool holder or workpiece holder 100 and tool interface 150.

FIG. 2b shows a detail of a set 2 comprising a machine tool and a tool holder or workpiece holder 100 according to FIG. 1, which illustrates the interaction of tool holder or workpiece holder 100 with a tool interface for tool holders according to the SK50 standard, specifically with the set in a state in which the tool holder or workpiece holder is disposed on the machine tool. This detail covers the region of interaction between the end section of a tool interface 160, facing the tool, of a spindle of a different machine tool from that of the set of FIG. 2a or a spindle of the same machine tool as that of the set of FIG. 2a, and the coupling section 120 of the tool holder or workpiece holder 100. In this case, the illustrated tool interface 160 is designed to receive tool holders that comply with the HSK80 standard.

In FIG. 2b as well, only a portion of tool interface 160, namely section 161, which is not modified in this case, interacts with coupling section 120 of the tool holder or workpiece holder, more precisely with section 122b of adapter ring 122, which is now situated in annular groove 124 in an orientation rotated 180°. This is sufficient to reliably achieve the coupling between tool holder or workpiece holder 100 and tool interface 160.

FIG. 3 shows a second exemplary embodiment of a tool holder or workpiece holder 200 for coupling a tool (not shown in FIG. 3) to a drive spindle of a machine tool (likewise not shown in FIG. 3). On the tool side, i.e., on the side on which the tool is held, tool holder or workpiece holder 200 has a tool holding or workpiece holding section 210. For its part, tool holding or workpiece holding section 210 comprises as clamping means 211 a conventional collet chuck with collet 212 increasing in size toward the tool side and being received in a partially tapered guide 213 and clamped to guide 213 by means of plate spring stack 214 such that collet 212 is drawn into the conical section 213a of the guide and is thus clamped in its closed position. To overcome this bias, for example when inserting a tool, a ram 215 is provided.

On the machine side, i.e., on the side on which the interaction with the drive spindle or its tool interface is produced, tool holder or workpiece holder 200 further comprises a coupling section 220 for coupling to a tool interface (not shown in FIG. 1) of a drive spindle of a machine tool. In addition to a collar 221, which serves as a stop 226, said coupling section 220 has a first section 222, which enables coupling to a tool interface for receiving tool holders or workpiece holders that comply with a first standard, in this case the SK50 standard, along with an adjacent second section 224, connected indirectly to the first section 222, i.e. via an intermediate section 223 to the first section 222, which enables coupling to a tool interface for receiving tool holders or workpiece holders that comply with the first standard. The first section 222 thus corresponds to a section of an SK50 taper, while the second section 224 corresponds to a section of an HSK80 taper.

FIG. 4a shows a detail of a set 3 comprising a machine tool and a tool holder or workpiece holder 200 according to FIG. 3, which illustrates the interaction of tool holder or workpiece holder 200 with a tool interface for tool holders that comply with the SK50 standard, specifically with the set in a state in which the tool holder or workpiece holder is disposed on the machine tool. This detail covers the region of interaction between the end section of a tool interface 250, facing the tool, of a spindle of a machine tool and the coupling section 220 of the tool holder or workpiece holder 200.

In this case, the illustrated tool interface 250 is designed to receive tool holders that comply with the SK50 standard, however it includes in its end region facing the tool a modified section 251, which is configured with an annular recess having a diameter of 70 mm.

As is clear from FIG. 4a, only a portion of tool interface 250, the section 252, interacts with coupling section 220 of the tool holder or workpiece holder, more precisely, with the first section 221. This is sufficient to reliably achieve the coupling between tool holder or workpiece holder 200 and tool interface 250.

FIG. 4b shows a detail of a set 4 comprising a machine tool and a tool holder or workpiece holder 200 according to FIG. 3, which illustrates the interaction of tool holder or workpiece holder 200 with a tool interface for tool holders that comply with the SK50 standard, specifically with the set in a state in which the tool holder or workpiece holder is disposed on the machine tool. This detail covers the region of interaction between the end section of a tool interface 260, facing the tool, of a spindle of a different machine tool from that of the set of FIG. 4a or a spindle of the same machine tool as that of the set of FIG. 4a, and the coupling section 220 of the tool holder or workpiece holder 200. In this case, the illustrated tool interface 260 is designed to receive tool holders according to the HSK80 standard.

In FIG. 4b as well, only a portion of tool holder or workpiece holder 200, namely the section 261, interacts with coupling section 220 of the tool holder or workpiece holder, more precisely, with the second section 224. This is sufficient to reliably achieve the coupling between tool holder or workpiece holder 200 and tool interface 260.

LIST OF REFERENCE SIGNS 1, 2, 3, 4 set
100, 200 tool holder or workpiece holder
110, 210 tool holding or workpiece holding section
111, 211 clamping means
120, 220 coupling section
121, 221 collar
122 adapter ring
122a, 122b outer contour
124 annular groove
125 screw
126, 226 stop
150, 160, 250, 260 tool interface
151, 251 modified section
161, 252, 261 section
212 collet
213 guide
213a section
214 plate spring stack
215 ram
222 first section
223 intermediate section
224 second section
252 section
E plane

The invention claimed is:

1. A tool holder or workpiece holder (100, 200) for coupling a tool or workpiece to a drive spindle of a machine tool, wherein the tool holder or workpiece holder (100, 200) comprises:
   a tool holding or workpiece holding section (110, 210) on which a clamping means (111, 211) for holding the tool or workpiece is arranged; and
   a coupling section (120, 220) for coupling to a tool interface (150, 160, 250, 260) of the drive spindle of the machine tool, wherein the coupling section (120, 220) is configured to be suitable for coupling both to a tool interface (150, 250) for receiving tool holders or workpiece holders that comply with a first standard and to a tool interface (160, 260) for receiving tool holders or workpiece holders that comply with a second standard,
   wherein the coupling section (120) comprises an adapter ring (222) that can be fixed on the tool holder or workpiece holder (100) in two different orientations, such that when the adapter ring (122) is in one orientation, the tool holder or workpiece holder (100) can be coupled to the tool interface (150) for receiving the tool holders or the workpiece holders that comply with the first standard, and when the adapter ring (122) is in the other orientation, the tool holder or the workpiece holder can be coupled to the tool interface (160) for receiving the tool holders or the workpiece holders that comply with the second standard.

2. The tool holder or workpiece holder (100) according to claim 1,
   wherein the adapter ring (122) is received partially in an annular groove (124) introduced into the tool holder or the workpiece holder (100).

3. The tool holder or workpiece holder (200) according to claim 1,
   wherein the coupling section (220) has a first section (222), which enables coupling to the tool interface (250) for receiving the tool holders or the workpiece holders that comply with the first standard, and a second section (224) directly or indirectly adjoining the first section (222), which enables coupling to the tool interface (260) for receiving the tool holders or the workpiece holders that comply with the second standard.

4. The tool holder or workpiece holder (100, 200) according to claim 1,
   wherein the tool interface (150, 250) for receiving the tool holders or the workpiece holders that comply with the first standard is a tool interface (150, 250) suitable for steep taper tool holders, and wherein the tool interface (160, 260) for receiving the tool holders or the workpiece holders that comply with the second standard is a tool interface (160, 260) suitable for hollow shank taper tool holders.

5. The tool holder or workpiece holder (100, 200) according to claim 1,
   wherein the tool holder or workpiece holder (100, 200) has a stop (126, 226) that defines the insertion depth of the tool holder or the workpiece holder (100, 200) into the tool interface (150, 160, 250, 260).

6. A set (1, 2, 3, 4) comprising a machine tool having at least one spindle, which has a tool interface (150, 160, 250, 260) for receiving tool holders or workpiece holders that comply with a first standard, and also comprising at least one tool holder or workpiece holder (100, 200) according to claim 1.

7. The set (1, 3) according to claim 6,
wherein the tool interface (150, 250) has a modified section (151, 152).

8. The set (1, 2, 3, 4) according to claim 6,
wherein when the tool holder or the workpiece holder (100, 200) is disposed as intended at the tool interface (150, 160, 250, 260), only portions (151, 161, 252, 261) of the tool interface interact with the coupling section (120, 220) of the tool holder or the workpiece holder (100, 200).

9. A tool holder or workpiece holder (100, 200) for coupling a tool or workpiece to a drive spindle of a machine tool, wherein the tool holder or workpiece holder (100, 200) comprises:
a tool holding or workpiece holding section (110, 210) on which a clamping means (111, 211) for holding the tool or workpiece is arranged; and
a coupling section (120, 220) for coupling to a tool interface (150, 160, 250, 260) of the drive spindle of the machine tool, wherein the coupling section (120, 220) is configured to be suitable for coupling both to a tool interface (150, 250) for receiving tool holders or workpiece holders that comply with a first standard and to a tool interface (160, 260) for receiving tool holders or workpiece holders that comply with a second standard,
wherein the coupling section (220) comprises a first section (222) which enables coupling to the tool interface (250) for receiving the tool holders or the workpiece holders that comply with the first standard, and a second section (224) directly or indirectly adjoining the first section (222), which enables coupling to the tool interface (260) for receiving the tool holders or the workpiece holders that comply with the second standard.

10. The tool holder or workpiece holder (100) according to claim 9,
wherein the coupling section (120) has an adapter ring (222) that can be fixed on the tool holder or the workpiece holder (100) in two different orientations, such that when the adapter ring (122) is in one orientation, the tool holder or the workpiece holder (100) can be coupled to the tool interface (150) for receiving the tool holders or the workpiece holders that comply with the first standard, and when the adapter ring (122) is in the other orientation, the tool holder or the workpiece holder can be coupled to the tool interface (160) for receiving the tool holders or the workpiece holders that comply with the second standard.

11. The tool holder or workpiece holder (100) according to claim 10,
wherein the adapter ring (122) is received partially in an annular groove (124) introduced into the tool holder or the workpiece holder (100).

12. The tool holder or workpiece holder (100, 200) according to claim 9,
wherein the tool interface (150, 250) for receiving the tool holders or the workpiece holders that comply with the first standard is a tool interface (150, 250) suitable for steep taper tool holders, and wherein the tool interface (160, 260) for receiving the tool holders or the workpiece holders that comply with the second standard is a tool interface (160, 260) suitable for hollow shank taper tool holders.

13. The tool holder or workpiece holder (100, 200) according to claim 9,
wherein the tool holder or the workpiece holder (100, 200) has a stop (126, 226) that defines the insertion depth of the tool holder or the workpiece holder (100, 200) into the tool interface (150, 160, 250, 260).

14. A set (1, 2, 3, 4) comprising a machine tool having at least one spindle, which has a tool interface (150, 160, 250, 260) for receiving tool holders or workpiece holders that comply with a first standard, and also comprising at least one tool holder or workpiece holder (100, 200) according to claim 10.

15. The set (1, 3) according to claim 14,
wherein the tool interface (150, 250) has a modified section (151, 152).

16. The set (1, 2, 3, 4) according to claim 14,
wherein when the tool holder or workpiece holder (100, 200) is disposed as intended at the tool interface (150, 160, 250, 260), only portions (151, 161, 252, 261) of the tool interface interact with the coupling section (120, 220) of the tool holder or workpiece holder (100, 200).

\* \* \* \* \*